United States Patent [19]

Hepp et al.

[11] 3,746,142

[45] July 17, 1973

[54] LINE PRINTER PAPER TENSIONING MECHANISM

[75] Inventors: Harold E. Hepp; James E. White, both of Dayton, Ohio

[73] Assignee: The National Cash Register Company, Dayton, Ohio

[22] Filed: Dec. 13, 1971

[21] Appl. No.: 207,127

[52] U.S. Cl............ 197/133 R, 197/64, 197/138 R, 226/84, 226/195
[51] Int. Cl............................................. B41j 15/00
[58] Field of Search................. 197/64, 127 R, 128, 197/130, 133 R, 133 F, 133 P, 133 A, 133 T, 134, 138 R, 138 A, 183; 226/84, 85, 195

[56] References Cited
UNITED STATES PATENTS

| | | | |
|---|---|---|---|
| 1,003,414 | 9/1911 | Barrett | 197/64 X |
| 1,278,474 | 9/1918 | Ireland | 197/133 P |
| 1,425,907 | 8/1922 | Sherman | 197/133 P |
| 1,483,319 | 2/1924 | Swartz | 226/84 X |
| 1,738,024 | 12/1929 | Schlichter | 197/133 R |
| 2,650,090 | 8/1953 | Davidson et al. | 197/133 R X |
| 3,313,387 | 4/1967 | Lenney | 197/64 |
| 3,430,748 | 3/1969 | Parri | 197/130 |
| 3,519,117 | 7/1970 | Smith | 197/127 R X |

FOREIGN PATENTS OR APPLICATIONS

| | | | |
|---|---|---|---|
| 469,383 | 12/1928 | Germany | 197/133 R |

*Primary Examiner*—Ernest T. Wright, Jr.
*Attorney*—J. T. Cavender, Wilbert Hawk, Jr. and George J. Muckenthaler

[57] ABSTRACT

Paper tension mechanism for a line printer having an output tractor drive wherein the tension mechanism is utilized in lieu of an input tractor drive. A cross shaft has pinwheels secured near each end thereof to engage with perforated paper, and one end of the shaft carries a slip bearing and a torsion collar with a torsion spring therebetween, the spring being in contact with the bearing and the collar, and wherein the slip bearing is pinched between a fixed block and a spring loaded block. Rotation of the cross shaft, in response to driving of the output tractors, winds the torsion spring until the force is sufficient to rotate the slip bearing. The "drag" provided by the bearing applies tension to the paper in the area between the output tractors and the pinwheels, and when paper movement is stopped, as during the printing operation, the torsion spring tends to unwind and thereby holds the paper in tension. Adjustment means is also provided for the slip bearing by either increasing or decreasing the amount of pinch of the split block on the bearing, which, in turn, affects the tension in the paper.

10 Claims, 6 Drawing Figures

United States Patent
Hepp et al.
[11] 3,746,142
[45] July 17, 1973
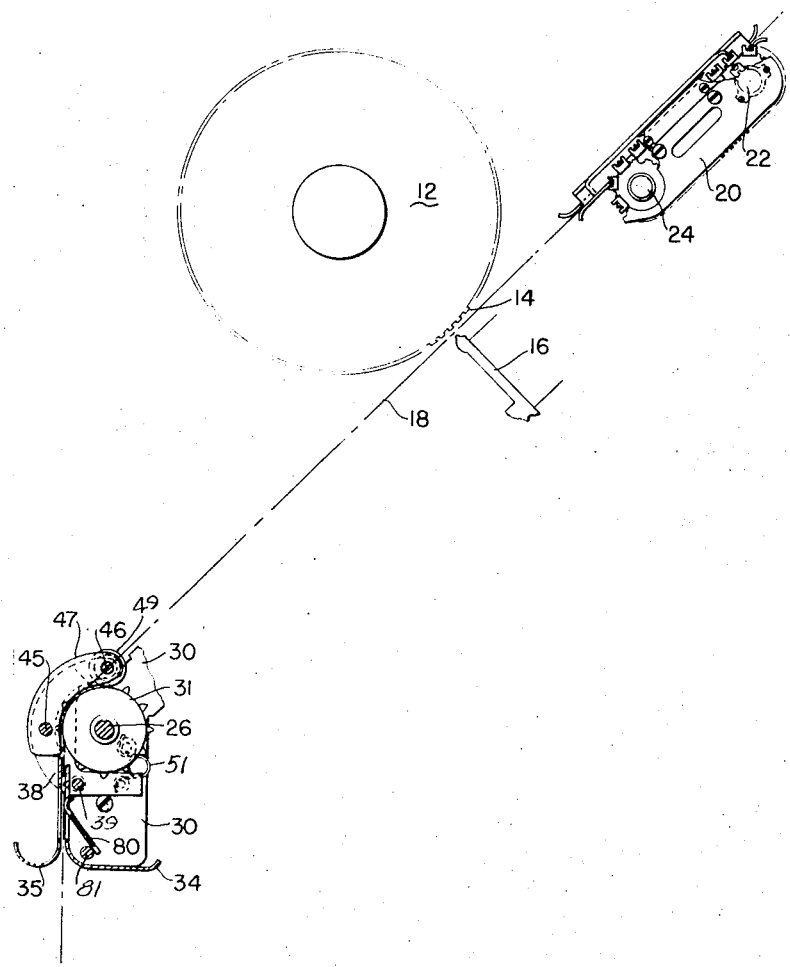

Patented July 17, 1973
3,746,142
3 Sheets-Sheet 1
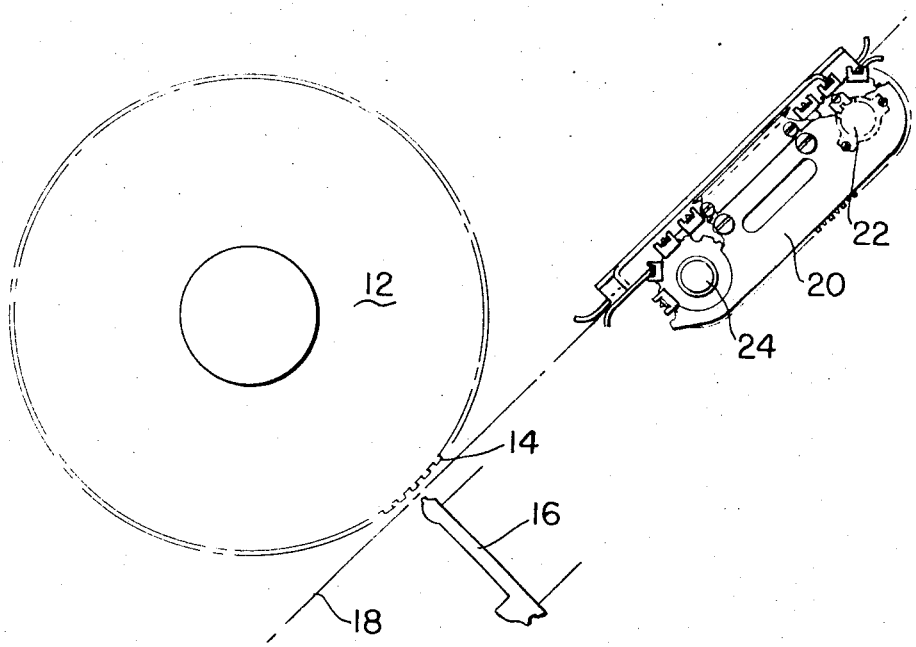
FIG. 1
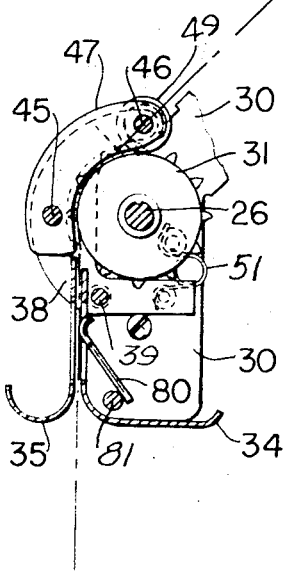
INVENTORS
HAROLD E. HEPP &
JAMES E. WHITE
BY *Wilbert Hawk, Jr.*
*Geo. J. Meckentaler*
THEIR ATTORNEYS

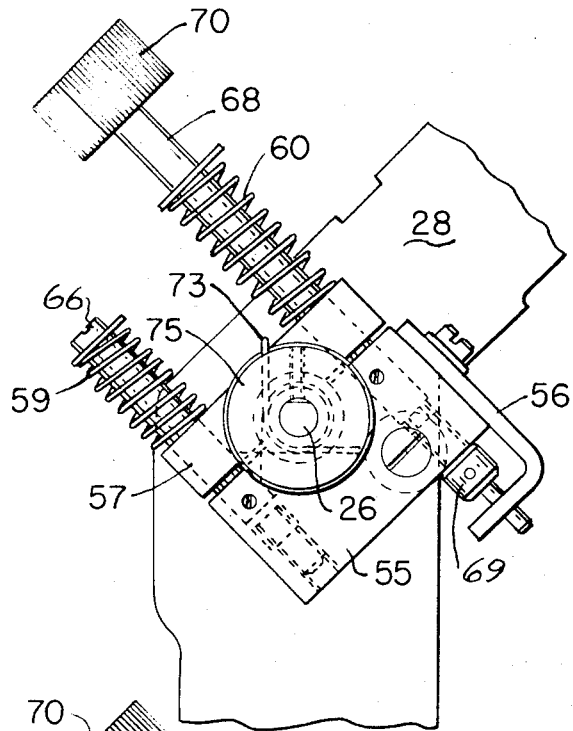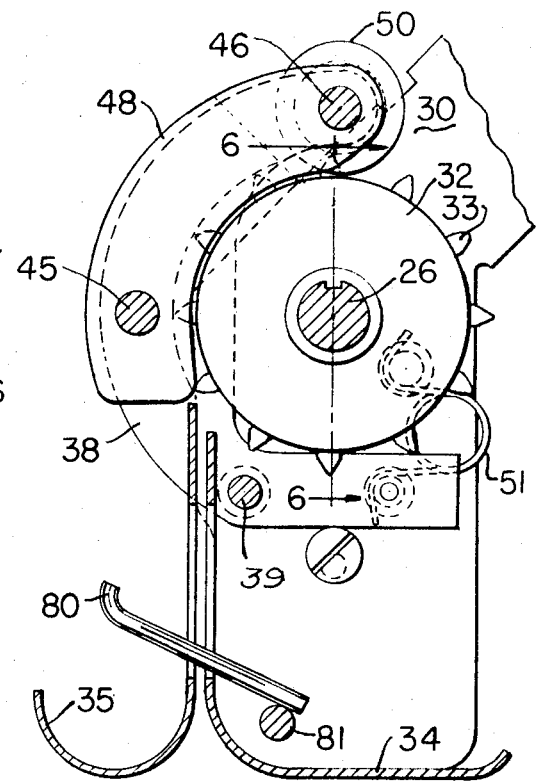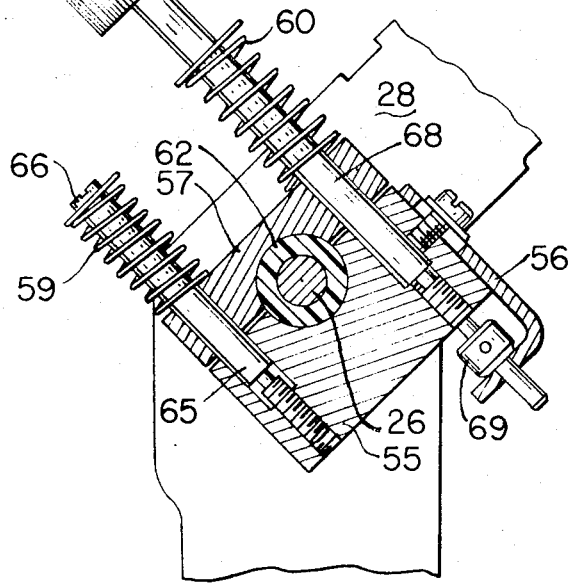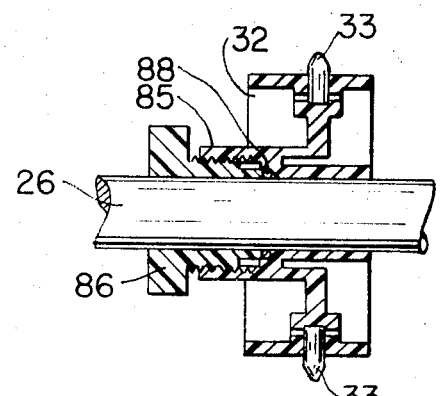
FIG. 3
FIG. 4
FIG. 5
FIG. 6
INVENTORS
HAROLD E. HEPP &
JAMES E. WHITE
BY *Wilbert Hawk, Jr.*
*Geo. J. Muckenthaler*
THEIR ATTORNEYS

LINE PRINTER PAPER TENSIONING MECHANISM

BACKGROUND OF THE INVENTION

In the area of high speed printers it has been common design practice to provide a set of input tractor mechanisms and a set of output tractor mechanisms to precisely control the flow of the paper through the printer and especially the attitude or position of the paper during the printing operation. A typedrum with print hammers adjacent thereto is located in lateral position between the tractors, and the hammers strike against the paper and the typedrum characters to print the selected characters on the paper.

It is desirable that, in order to obtain good print quality, the hammers make contact with the paper and against the typedrum at a precise time during the printing operation when the paper is stopped and in a state of proper tension. Such proper tension is important in the printing of a single-part form paper, but it becomes more important when printing on multiple part forms.

A number of ways and means for providing and maintaining tension in belts, webs, paper and the like have been seen in the prior art. For example, a web drive mechanism is shown and described in U.S. Pat. No. 2,838,250, issued on the application of S. Stavrakis and C. J. Kennedy, wherein drag tension is applied to the web regardless of drive direction and wherein a common belt drives a capstan and a pinch roller through friction slip clutches. A pressure pad is pivoted into and out of engagement with the web to impart the drag tension.

Another example of tension exertion is provided for in the contact printer and paper drive as shown and described in U.S. Pat. No. 3,460,732, on the application of K. J. Kallenberg. The mechanism exerts a constant tension on the paper feed roller, by means of a slip clutch or friction drive, normally latched, but controlled by a magnetic element and a switch to disable the drive.

U.S. Pat No. 3,570,736, issued on the application of R. A. Skiba, shows and describes a paper tension and registration apparatus wherein the tension is controlled by lengthening one segment of a drive belt and shortening another segment of the belt.

Web tensioning apparatus is also shown and described in U.S. Pat. No. 3,586,149, on the application of R. H. Miller, wherein the web is kept under tension by a series of elliptical springs mounted on a rotatable adjuster rod and a backup bar mounted on a resilient pad, the bar having the same surface characteristics as do the springs.

SUMMARY OF THE INVENTION

The present invention relates to line printers and more particularly to means for providing and maintaining proper tension in the record material as it passes through the machine. The paper or like record material utilized in a line printer generally is of the continuous type and may be of the single-part form or the multiple part form, with the multiple form being interlaced with carbon papers for the preparation of a plurality of copies. The output tractor mechanism includes a driven shaft with tractors having pin elements on the marginal sides of the paper for engaging with perforations in the paper for driving thereof. In lieu of an input tractor drive mechanism, a cross shaft carries pin wheels near the end thereof with the pins also engaging with the perforations to maintain the paper form in an aligned condition as it is moved through the printing station or area. The pin wheels are secured to the cross shaft so that the driving force for the cross shaft and the pin wheels is derived from the output tractor mechanism through the paper form, that is, the cross shaft is idly supported in the line up, but driven by the output tractors. A typedrum is positioned in the area between the output tractor mechanism and the cross shaft, and a plurality of type hammers are adjacent the drum for performing the printing operations on the paper form as it moves past the drum.

The cross shaft carries a slip bearing and a torsion collar near one end thereof with a torsion spring operating between the bearing and the collar for exerting continuous influence upon the bearing in relation to the collar, the collar being secured to the shaft to rotate therewith. The slip bearing is carried in cradle-like manner in a pocket provided by a fixed block and a movable block, there being compression means for biasing the movable block toward the fixed block and means for adjusting the bias on the movable block. Increasing or decreasing the force exerted on the movable block through the compression means causes a corresponding change in the force required to rotate the slip bearing, which, in turn, increases or decreases the tension in the paper as the bearing rotates to drive the pin wheels and the cross shaft. This construction, in effect, exerts a "drag" on the paper form as it is moved past the typedrum.

During the printing cycle or operation, the torsion spring tends to unwind and to rotate the pin wheels and the cross shaft in the opposite direction from that of the driving direction, and thereby also maintain proper tension in the paper forms at the instant of printing.

In accordance with the above discussion, the principal object of the present invention is to provide lower cost drive and control means for the form paper in a line printer.

Another object of the present invention is to provide mechanism for maintaining proper tension in the form paper or like record material as it passes through the printing area.

A further object of the present invention is to provide means for adjusting the tension in the form paper as it passes through the printing area.

An additional object of the present invention is to provide means for maintaining proper registration of a plurality of paper forms, in addition to providing proper tension in the forms as they are moved through the printer.

Additional features and advantages of the present invention will become apparent and fully understood from a reading of the following description taken together with the annexed drawing, in which:

FIG. 1 is a side elevational view of partial mechanism for a line printer, partly broken away, and showing the path of record material therethrough;

FIG. 3 is a right side elevational view of the tensioning mechanism of the present invention;

FIG. 4 is a view taken on the line 4—4 of FIG. 2;

FIG. 5 is a sectional view taken on the line 5—5 of FIG. 2; and

FIG. 6 is a sectional view taken on the line 6—6 of FIG. 4.

Figure 2:
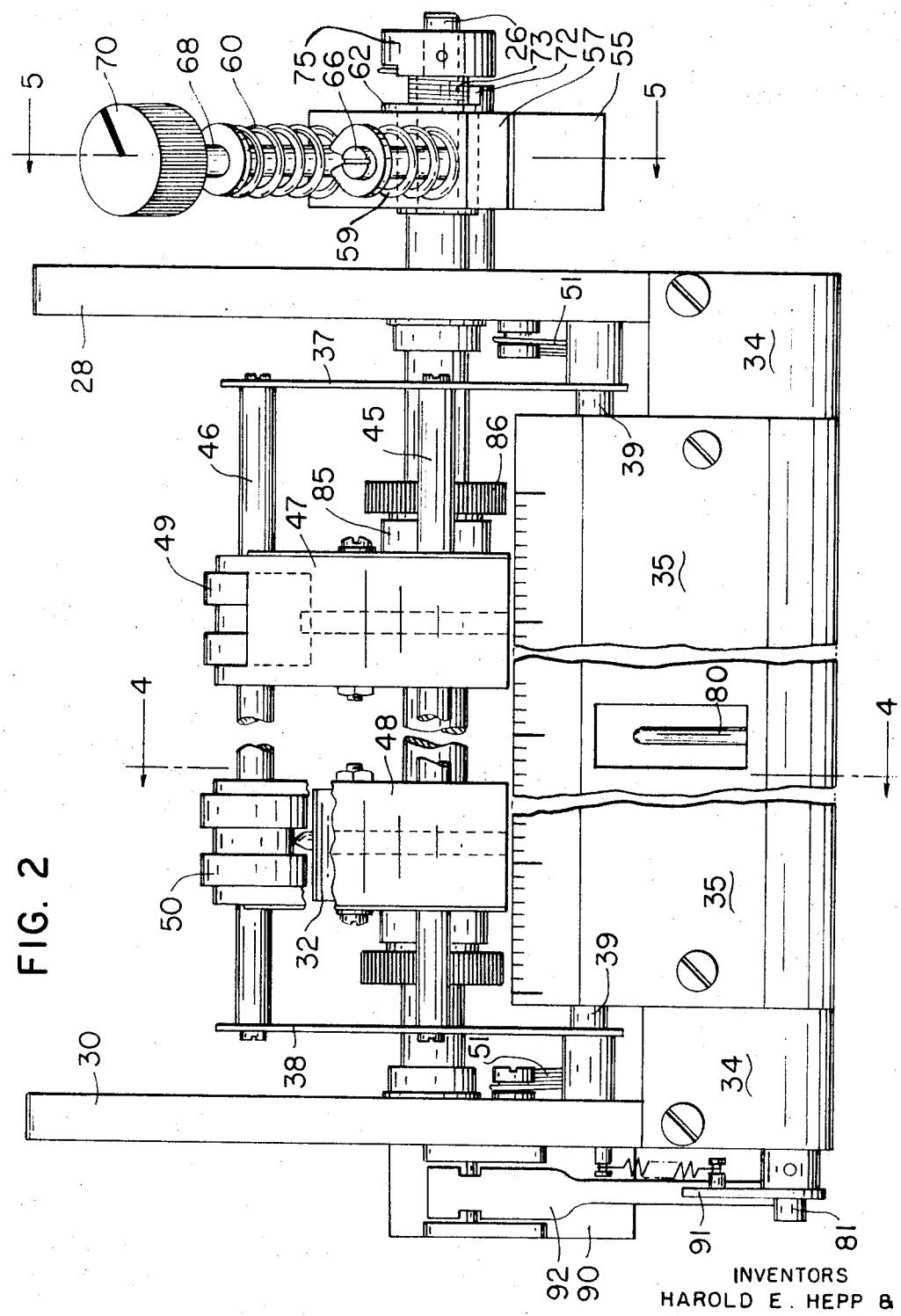
FIG. 2 is a front elevational view of the record material tensioning mechanism.

Referring to FIG. 1 of the drawing, there is shown a typedrum 12 having type characters 14 on the periphery thereof, and rotatably carried in position to be struck by a plurality of print hammers 16 (only one of which is shown) and which are supported in side-by-side relationship. A sheet of record material 18 such as continuous-form paper or the like is driven by a tractor mechanism 20 in a stop-and-go high speed manner so as to enable line printing by the plurality of hammers 16. The tractor mechanism 20 is of the pin feed type and is substantially the same construction as that fully shown and described in U.S. Pat. No. 3,507,431, issued to H. E. Hepp and R. W. Biser, and assigned to the same assignee as the present invention. Suffice it to mention that tractor mechanism 20 is a right unit, and that a left hand unit is spaced the width of the form paper from the right hand unit to drive the paper at each side thereof. These units are positioned to precisely control the drive and alignment of the paper during the printing operation. Generally, the tractor mechanisms are supported from a drive shaft, as 22, and an idler shaft, as 24, with appropriate sprockets for carrying the timing belts which include the pin elements for engaging with spaced apertures along the margins of the form paper.

In the usual line-up, the tractor mechanism 20 is referred to as an output drive, and cooperating therewith is an input mechanism for providing precise control of the alignment of the paper and additionally for providing proper tensioning thereof. As is well known in the line printer art, the paper may appear to be in continuous motion during operation, however, the tractor mechanisms are precisely controlled to stop the flow of the paper during the instant of printing time and therefore the paper is stopped and started for each line of printing. Recent concepts and improvements in the drive train, however, have determined that, in some instances, an output tractor mechanism is sufficient to properly control the motion and alignment of the paper as it travels through the printer, but some additional means must be provided to initiate and to maintain proper tension in the paper as it travels through the printing area of the machine. A tension in the paper imparted by use of drag means is usually adequate for a single continuous form, but the multiple part forms require control of all the sheets for the purpose of presenting a taut surface in the area of the type drum for impact by the print hammers. While a double set of tractor mechanisms, input and output, performs to properly drive, to align, and to provide tension in the paper forms, it has been found that drive and alignment can be adequately maintained by the use of output tractors only and that proper tension in the forms can be provided by such additional means.

Such additional means for initiating and for maintaining proper tension in record material or like form paper in a printer is shown and described in the present invention wherein a tensioning mechanism is provided in lieu of the input tractor mechanisms for keeping the form paper in proper tension. As illustrated in the several figures of the drawing, the tensioning mechanism is carried on a cross shaft 26 suitably journaled in right 28 and left 30 side frames (FIG. 2). The cross shaft 26 has a pair of pin wheels 31 and 32, see FIGS. 1, 2, and 3, secured thereto for rotating with the shaft 26, each of the wheels 31, 32 carrying a plurality of pins 33 on the periphery thereof for engaging with apertures along the margins of the form paper 18. The paper 18 feeds into the printer area through a throat formed by transversely elongated infeed paper guides 34, 35 (FIGS. 1 and 4) to insure proper flow of the previously fanfolded forms and to guide the unfolded continuous paper 18 over the pin wheels 31 and 32. Right and left paper guide line members 37 and 38 (FIG. 2) are swingably carried on a shaft 39 journaled in the respective side frames 28, 30 so that the members 37, 38 can be swung outwardly from the pin wheels 31, 32 upon loading of the paper form 18 into the printer. Support shafts 45 and 46 are connected to guide members 37, 38 and carry paper guides 47, 48 which are aligned with the pin wheels 31 and 32 and cooperate therewith, the shaft 46 having a pair of pin wheel rolls 49, 50 to maintain the paper 18 in proper proximity with the pin wheels 31, 32 and insure that the pins 33 engage with the perforations in the paper 18. A retaining spring 51 (FIG. 4) is used to aid in operation of the paper guide 47, 48 as it is swung from one to another position. Suffice it to say that the paper input mechanism is constructed to carry the form paper 18 in an aligned condition toward the printing station, without the benefit of a directly driven input tractor mechanism for moving the paper 18.

As mentioned above, the output tractor mechanisms provide the drive for moving the form paper 18 through the printer, and a tensioning mechanism maintains proper tension in the form paper 18 in both the moving and the stopped conditions of the paper 18. Referring to FIGS. 2, 3 and 5, the tensioning mechanism is carried at the right side of the printer area near the end of the cross shaft 26 and includes a drag block 55 supported in rigid manner from a machine frame member 56, there being a pressure block 57 spaced from the drag block 55, and resilient means in the form of compression springs 59 and 60 exerting pressure against the pressure block 57 and clamping against a plastic slip bearing 62 cradled between the two blocks 55, 57. The pressure exerted by spring 59 is substantially fixed, however the stem 65 carries an adjusting head 66 to initially set the compression pressure and to change such pressure as the need arises. On the opposite side of the cross shaft 26 from the stem 65 is a shaft or stem 68 running through the pressure 57 and drag 55 blocks and terminating beyond the frame member 56, there being an adjusting coupling 69 on the stem 68 for correctly positioning the stem 68 in the blocks 55, 57 in relation to the compression spring 60. An adjusting knob 70 is provided on the end of the stem 68 to vary the pressure on the spring 60 which, in effect, opens and closes the gap between the pressure 57 and the drag 55 block.

As mentioned above, the slip bearing 62 is cradled between the pressure 57 and drag 55 blocks and is a carefully machined plastic part to fit on the cross shaft 26, the bearing 62 having a protruding portion 72 (FIG. 2) with a flattened surface for receiving one end of a torsion spring 73 which is wrapped around the shaft 26. Secured near the end of the shaft 26 is a spring collar 75 having a flattened surface for receiving the other end of the torsion spring 73. Since the collar 75 is fixed to the cross shaft 26 and rotates therewith upon rotation of the pin wheels 31 and 32 in response to driving of the form paper 18 by the output tractors 20, the torsion spring 73 is effective to transmit a force generated by such rotation to the slip bearing 62. The pinching of the slip bearing 62 by the pressure and drag blocks 57, 55 determines the amount of drag on the cross shaft 26 and the tension in the paper 18 as it moves through the printing station.

Additional features realized by the instant invention include the provision of a paper feeler 80 (FIGS. 1 and 4) secured to a shaft 81 for detecting the presence of a form paper 18 traveling in the throat between the guides 34 and 35.

Cooperating with the paper feeler 80 and its shaft 81 is a switch arrangement comprising a snap action switch 90 (FIG. 2) and a spring-held switch cam 91 engageable with an arm 92 to operate the switch 90 upon presence or absence of form paper 18 in the printer area. Switch 90 is a permissive switch which turns the printer on-and-off.

Another feature is the provision for adjusting the position of the pin wheels 31 and 32 along the cross shaft 26 and the means for locking the pin wheels 31, 32 in the desired place, as seen in FIG. 6. The pin wheels 31, 32 are, of course, keyed to the shaft 26 and include a flange portion 85 having an inside threaded portion adaptable to receive the threads of a pin wheel knurled knob 86. Portion 85 has an interior surface sloping from one end of its threaded portion in decreasing diameter approaching the diameter of the cross shaft 26 and a locking spring 88 is captured between the sloping surface and the end of the threaded portion of the knob 86. This construction provides a convenient means for adjusting the position of and for locking the pin wheels 31, 32 along the cross shaft 26.

In the operation of the tensioning mechanism, the pin wheels 31 and 32 are adjusted and locked along the shaft 26, the form paper 18 is inserted between the guides 34, 35 and, upon engagement of the paper 18 with feelers 80, the shaft 81 is rotated to cam the arm 92 to close the switch 90 and thus make ready for printer operation. With the pin wheel rolls 49 and 50 swung forwardly, the form paper 18 is threaded over the pin wheels 31, 32 and positioned on the output drive tractors 20 in the path shown in FIG. 1. With the drive tractors 20 in motion, the paper 18 is pulled past the typedrum 12 and the print hammers 16, and, by reason of engagement of the pins 33 with apertures in the paper 18, the continuous form is carried in an aligned manner with the pin wheels 31, 32 and the cross shaft 26 being rotated in unison with the tractor mechanism. During movement of the paper 18, the rotation of the cross shaft 26 and the spring collar 75 winds the torsion spring 73, the ends of which bear against the flat surfaces on the collar 75 and the bearing 62, until sufficient force on the bearing 62 causes it to rotate within the cradle formed by the drag and pressure blocks 55 and 57, respectively. The tension in the paper 18 can be observed as it travels past the printing station, and an increase or a decrease in such tension can be made by means of the adjusting knob 70 to cause a corresponding change in the force required to rotate the slip bearing 62. During the instant time of acutal printing, that is, when the drive tractors 20 are momentarily stopped, the torsion spring 73 tends to unwind and to rotate the shaft 26 and the pin wheels 31, 32 in the opposite direction to thereby maintain tension in the paper 18.

It is thus seen that herein shown and described is a paper tensioning mechanism which operates to provide a drag or tension on the paper at all times during its travel through the printing station. The mechanism enables the accomplishment of the objects and advantages mentioned above, and while only one embodiment of the invention has been disclosed herein, certain variations may occur to those skilled in the art. It is contemplated that all such variations, not departing from the spirit and scope of the invention hereof, are to be construed in accordance with the following claims.

What is claimed is:

1. Record material tensioning mechanism in combination with rotatable means for driving record material, said tensioning mechanism comprising:
    shaft means idly supported and spaced from said means for driving,
    means secured to the shaft means and engageable with the record material to be rotated thereby upon movement thereof,
    clutch means on the shaft means including a collar member secured to the shaft means and a bearing member carried thereon,
    means connected with the collar member for biasing the bearing member in a direction opposite to the rotation of said means for driving, and
    means for clamping said bearing member to provide tension on the record material during the time of rotation and during the time of stoppage of the means secured to the shaft means.

2. The tensioning mechanism of claim 1 including means for adjusting the clamping means for increasing or decreasing the force required to rotate said bearing member.

3. The tensioning mechanism of claim 1 wherein the means secured to the shaft means are pin wheels for engagement with the record material.

4. The tensioning mechanism of claim 1 wherein the means for biasing is a torsion spring engageable with the collar member and with the bearing member tending to inhibit rotation of the bearing member until such time as sufficient force is exerted by the spring to rotate said bearing member.

5. The tensioning mechanism of claim 1 wherein the clamping means includes a fixed block and a spring loaded movable block substantially encircling the bearing member.

6. The tensioning mechanism of claim 1 wherein the collar member and the bearing member include opposed surfaces for said biasing means to engage thereon for causing said bearing member to rotate in one direction in response to rotation of the means for driving and for biasing said bearing member in the opposite direction upon stoppage of the means for driving.

7. In a line printer having a typedrum and a plurality of print hammers positioned to strike against said typedrum, record material tensioning apparatus for providing proper tension on record material as said record material passes between the typedrum and the print hammers, the combination with
    output tractor mechanism for driving the record material in one direction, a
    cross shaft spaced from said tractor mechanism and having pin wheels secured to the cross shaft for carrying said record material in a plane for printing thereon,
    clutching mechanism on said cross shaft including biasing means for resisting movement of the pin wheels upon initial operation of the tractor mechanism until sufficient force is exerted on said biasing means to rotate said clutching mechanism, said cross shaft and said pin wheels, and means for adjusting the clutching mechanism for increasing or decreasing the tension in the record material during the driving thereof.

8. In the printer of claim 7 wherein the clutching mechanism includes a collar secured to the cross shaft, a slip bearing carried on one end of the cross shaft, and a torsion spring engageable with the collar and the slip bearing for resisting initial rotation of the cross shaft.

9. In the printer of claim 7 wherein the means for adjusting the clutching mechanism includes a first member fixed in relation to the cross shaft and a second member movable in relation thereto and biasing means for moving the second member relative to the first member.

10. In the printer of claim 8 wherein the collar and the slip bearing include opposed surfaces for engagement by the torsion spring for causing said slip bearing to rotate in one direction in response to rotation of the tractor mechanism and for biasing said slip bearing in the other direction upon stoppage of rotation of the tractor mechanism.

* * * * *